(12) United States Patent
Boss et al.

(10) Patent No.: US 9,859,731 B2
(45) Date of Patent: Jan. 2, 2018

(54) ALTERNATE ALARM NOTIFICATIONS BASED ON BATTERY CONDITION

(71) Applicant: INTERNATIONAL BUSINESS MACHINES CORPORATION, Armonk, NY (US)

(72) Inventors: Gregory J. Boss, Saginaw, MI (US); Harini Jagannathan, Austin, TX (US); Kevin C. McConnell, Austin, TX (US); Minh Q. Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/996,832

(22) Filed: Jan. 15, 2016

(65) Prior Publication Data

US 2017/0207646 A1    Jul. 20, 2017

(51) Int. Cl.
*G08B 21/00* (2006.01)
*H02J 7/00* (2006.01)

(52) U.S. Cl.
CPC .................. *H02J 7/0047* (2013.01)

(58) Field of Classification Search
CPC .................................................. H02J 7/0047
See application file for complete search history.

(56) References Cited

U.S. PATENT DOCUMENTS

| 4,916,438 | A | 4/1990 | Collins et al. |
| 7,505,795 | B1 * | 3/2009 | Lim .................. H04W 52/0232 340/7.38 |
| 7,656,287 | B2 | 2/2010 | Albert et al. |
| 7,956,756 | B2 | 6/2011 | Kubey et al. |
| 8,792,854 | B2 | 7/2014 | Craine et al. |
| 9,065,922 | B2 * | 6/2015 | Khan ..................... H04L 67/306 |
| 2004/0217869 | A1 * | 11/2004 | Bouchard ............. B60R 25/102 340/573.4 |

(Continued)

FOREIGN PATENT DOCUMENTS

| CN | 1980430 | 6/2007 |
| CN | 101909112 | 12/2010 |

(Continued)

OTHER PUBLICATIONS

Mishra et al., "Smart Travel Alarm—Hybrid app on Sencha 2.2", International Journal of scientific research and management (IJSRM); vol. 2; Issue 7; pp. 1118-1125; Year 2014.
Weiner, "Smart Alarm Clock for Heavy Sleepers Promises to Get You out of Bed Fast", FastCodeDesign, http://www.fastcodesign.com/3046193/this-smart-alarm-clock-for-heavy-sleepers-promises-to-get-you-out-of-bed-fast, May 13, 2015, 4 Pages.

(Continued)

*Primary Examiner* — Quang D Pham
(74) *Attorney, Agent, or Firm* — Alexander G. Jochym

(57) ABSTRACT

Systems and methods for smart alarms are provided. A computer-implemented method includes: receiving, by a computing device, an input including a set alarm time; determining, by the computing device, a battery drain condition of the computing device; and based on the determining the battery drain condition, performing a step including one of: sounding the alarm prior to the set alarm time based on determining that a user-defined condition is met at a time of the battery drain condition; displaying a message on the computing device indicating the battery drain condition; and providing an alternate alert based on a detected sleep stage of a user corresponding to a predefined acceptable sleep stage.

8 Claims, 7 Drawing Sheets

(56) References Cited

U.S. PATENT DOCUMENTS

| | | | |
|---|---|---|---|
| 2009/0187780 A1* | 7/2009 | Keohane | G06F 1/3203 713/324 |
| 2010/0094103 A1* | 4/2010 | Kaplan | A61B 5/4809 600/301 |
| 2011/0071780 A1* | 3/2011 | Tarkoma | G01R 31/3679 702/63 |
| 2011/0128153 A1* | 6/2011 | Sims | G06F 1/3203 340/636.1 |
| 2013/0040662 A1 | 2/2013 | Elisco | |
| 2013/0090965 A1 | 4/2013 | Rivere | |
| 2013/0150117 A1 | 6/2013 | Rodriguez et al. | |
| 2013/0227318 A1* | 8/2013 | Musial | H04M 3/00 713/320 |
| 2013/0339436 A1* | 12/2013 | Gray | H04L 51/24 709/204 |
| 2014/0104993 A1 | 4/2014 | Shields | |
| 2014/0203944 A1* | 7/2014 | Lombardi | G08B 21/182 340/636.1 |
| 2014/0335814 A1* | 11/2014 | Gudlavenkatasiva | H04W 4/22 455/404.1 |
| 2014/0362123 A1* | 12/2014 | Kawahara | G06F 3/04845 345/684 |
| 2015/0061859 A1 | 3/2015 | Matsuoka et al. | |
| 2015/0208354 A1 | 7/2015 | Lokhande et al. | |
| 2015/0212918 A1 | 7/2015 | Cai et al. | |
| 2016/0004845 A1* | 1/2016 | Choudhury | G06F 21/10 726/28 |
| 2016/0292989 A1 | 10/2016 | Belk et al. | |
| 2017/0046496 A1* | 2/2017 | Johnstone | G06F 19/3406 |

FOREIGN PATENT DOCUMENTS

| | | |
|---|---|---|
| CN | 103607509 | 2/2014 |
| CN | 104683573 | 6/2015 |
| JP | 2001352394 | 12/2001 |
| JP | 2010278576 A * | 12/2010 |
| WO | 0041428 A1 | 7/2000 |
| WO | 2005/083988 | 9/2005 |

OTHER PUBLICATIONS

Mell et al., "The NIST Definition of Cloud Computing", NIST, Special Publication 800-145, Sep. 2011, 7 pages.

"A smarter and more interactive way to use alarms", An IP.com Prior Art Database Technical Disclosure, Authors et. al.: Disclosed Anonymously, IP.com No. 000224114, Publication Date: Dec. 10, 2012, 4 pages, <http://ip.com/IPCOM/000224114>.

"Adaptive Alarm", An IP.com Prior Art Database Technical Disclosure, Authors et. al.: Disclosed Anonymously, IP.com No. 000211142, Publication Date: Sep. 22, 2011, 6 pages, <http://ip.com/IPCOM/000211142>.

"Wake up or trigger alarm on mobile based on certain events", An IP.com Prior Art Database Technical Disclosure, Authors et. al.: Disclosed Anonymously, IP.com No. 000230923, Publication Date: Sep. 18, 2013, 4 pages, <http://ip.com/IPCOM/000230923>.

Boss et al., "Alternative Alarm Generator", U.S. Appl. No. 15/001,400, filed Jan. 20, 2016, 25 pages.

IBM, Appendix P, List of IBM Patents or Patent Applications Treated as Related, 2 pages, dated Feb. 4, 2016.

* cited by examiner

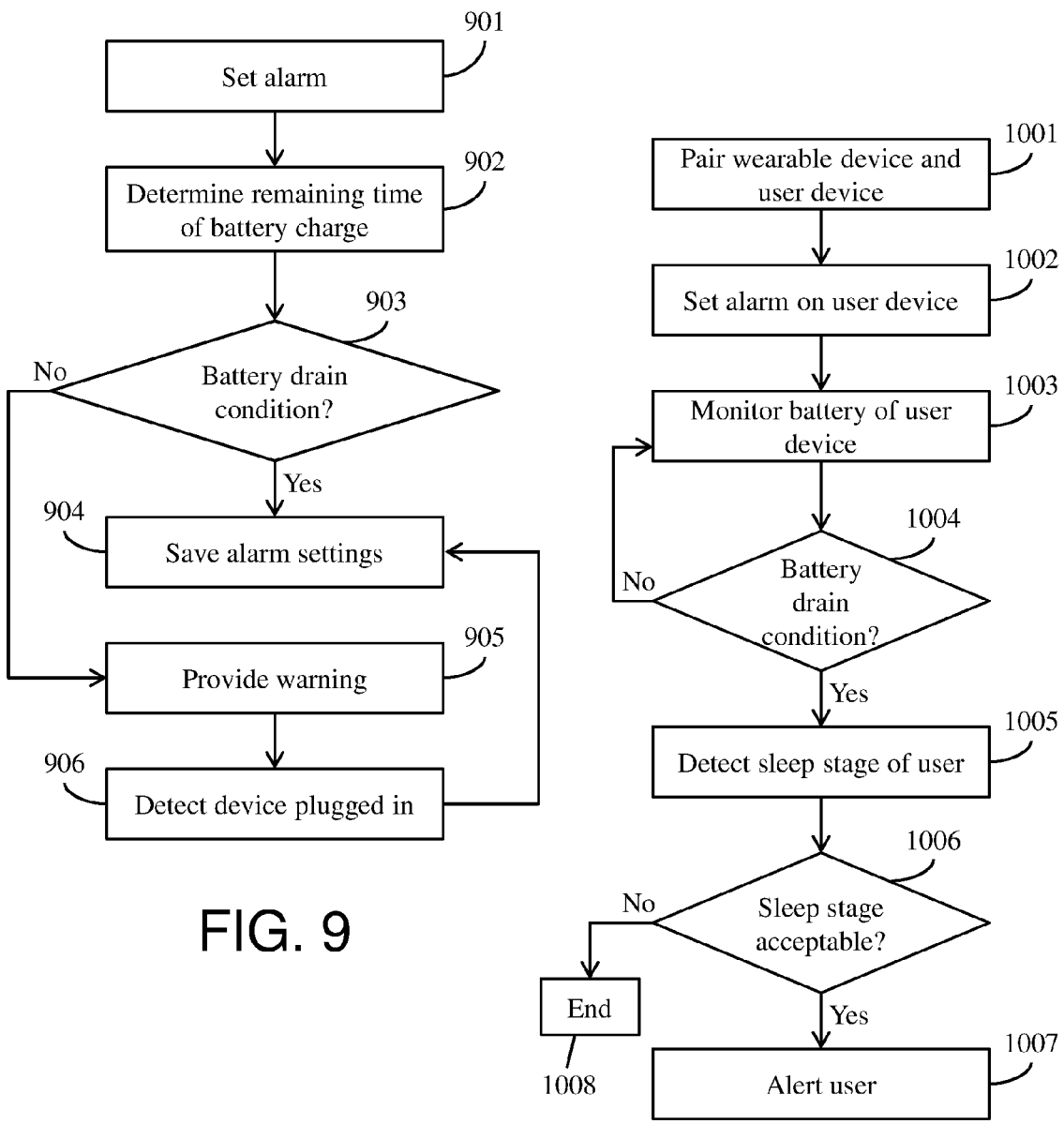

ALTERNATE ALARM NOTIFICATIONS BASED ON BATTERY CONDITION

BACKGROUND

The present invention relates generally to alarms on mobile devices and, more particularly, to preventative and reactive alternative event notification methods for ensuring an alarm is provided when a mobile device powers off due to battery drain.

Mobile devices, such as smartphones, are commonly provided with an alarm clock application. The user of the mobile device can define alarm settings in the alarm clock application including date, time, ringtone, and snooze settings. In this manner, the mobile device can be used in lieu of a traditional alarm clock. However, unlike a traditional alarm clock, a mobile device typically must have its battery recharged about once a day. Given this frequency of battery drain and recharge for mobile devices, it is common for a user to miss their alarm because their mobile device runs out of battery charge prior to the time that is set for the alarm to sound.

For example, on a particular evening, a user may set the alarm on their smartphone for 6:00 AM the following morning. Between the time the user sets the alarm and the scheduled time of the alarm, the smartphone may consume all its battery power (e.g., by one or more other applications running on the smartphone during this time period before the scheduled time of the alarm). In this scenario, due to the drained battery, the smartphone turns off (powers off) prior to the scheduled time of the alarm. This results in the smartphone being off and thus not emitting the alarm sound at the desired time of the alarm (e.g., at 6:00 AM in this example). The user thus misses their alarm and might oversleep and miss an event.

SUMMARY

In an aspect of the invention, there is a computer-implemented method that includes: receiving, by a computing device, an input comprising a set alarm time; and determining, by the computing device, a battery drain condition of the computing device. The method includes, based on the determining the battery drain condition, performing a step comprising one of: sounding the alarm prior to the set alarm time based on determining that a user-defined condition is met at a time of the battery drain condition; displaying a message on the computing device indicating the battery drain condition; and providing an alternate alert based on a detected sleep stage of a user corresponding to a predefined acceptable sleep stage.

In another aspect of the invention, there is a computer-implemented method including: receiving, by a computing device, preference data from a user device; and receiving, by the computing device, an alert from the user device indicating a battery drain condition of the user device and a set alarm time of the user device. The method includes, based on the receiving the alert, the computing device performing a step comprising one of: sending a message to plural trusted user devices of members of a backup alarm group specified in the preference data, wherein the message instructs the members to provide an alternate alert to a user associated with the user device; determining a ranked list of the members of the backup alarm group specified in the preference data, and sending the message to the highest ranked member in the ranked list; sending a control command to a networked appliance specified in the preference data; and calling a landline telephone specified in the preference data.

In another aspect of the invention, there is a system comprising a CPU, a computer readable memory and a computer readable storage medium associated with a computing device. The system includes program instructions to receive preference data from a user device. The system includes program instructions to receive an alert from the user device indicating a battery drain condition of the user device and a set alarm time of the user device. The system includes program instructions to, based on the receiving the alert, perform a step comprising one of: sending a message to plural trusted user devices of members of a backup alarm group specified in the preference data, wherein the message instructs the members to provide an alternate alert to a user associated with the user device; determining a ranked list of the members of the backup alarm group specified in the preference data, and sending the message to the highest ranked member in the ranked list; sending a control command to a networked appliance specified in the preference data; and calling a landline telephone specified in the preference data. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIGS. 5-10 show flowcharts of methods in accordance with aspects of the invention.

DETAILED DESCRIPTION

Figure 1:
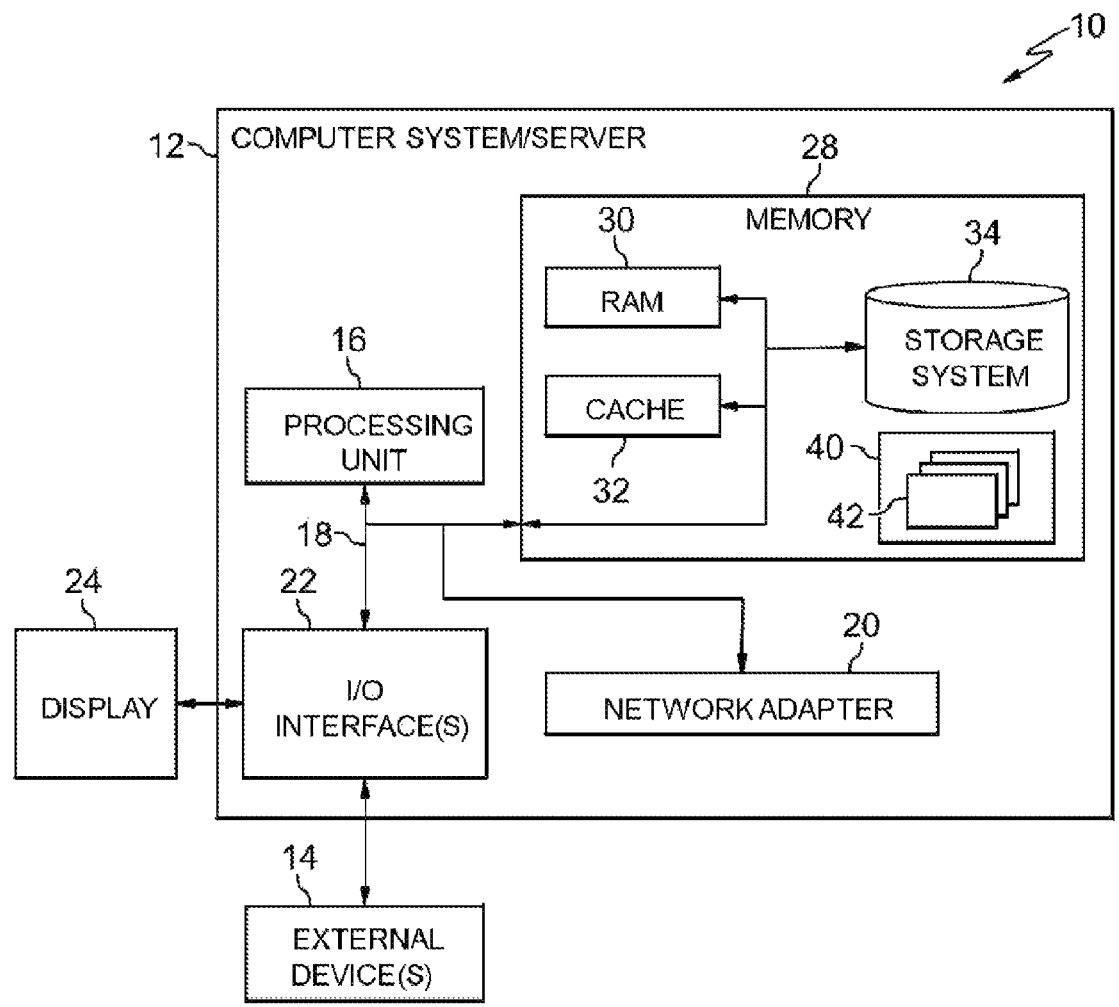
FIG. 1 depicts a cloud computing node according to an embodiment of the present invention.

The present invention relates generally to alarms on mobile devices and, more particularly, to preventative and reactive alternative event notification methods for ensuring an alarm is provided when a mobile device powers off due to battery drain. According to aspects of the invention there is a smart alarm clock system that averts a failed alarm when a device runs out of power. In embodiments, the system employs both predictive and reactive methods to ensure that the user is woken up. Predictive methods may be used to prevent the user from setting an alarm on their device when it is determined that the device will run out of battery power before the time the alarm is set to ring. Reactive methods may employ alternative methods to wake up a user when the user's device runs out of battery power before the time the alarm is set to ring. Some processes of the invention may be implemented using an alarm app (e.g., software application program) on the user's mobile device. Additional processes of the invention may be implemented using an alarm server connected to the user's mobile device. The alarm server may be connected to a cloud-based Internet of Things (IoT) network.

In embodiments, a system monitors the battery condition of an alarm device (e.g., smartphone), and implements one or more of the following methods when it is determined that a battery drain condition has occurred or will occur before the set time for the alarm to ring: cause the alarm device to ring the alarm earlier than the set alarm time when the battery drain condition occurs within a predefined threshold period prior to the set alarm time; contact a trusted user and ask the trusted user to use an alternative method to wake up an alarm user associated with the alarm device, e.g., by knocking on the alarm user's door, calling the alarm user's landline telephone, or turning on an IoT device in the alarm user's space; cause an alarm server to automatically use an alternative method to wake up the alarm user, e.g., by calling the alarm user's landline telephone, or turning on an IoT device in the alarm user's space; warning the alarm during setting the alarm when it is predicted that the battery will drain before the set time of the alarm; and cause a wearable device of the alarm user to interrupt the alarm user's sleep cycle.

Implementations of the invention may use a combination of plural ones of the methods described herein to prevent a missed alarm for a user. As noted herein, certain ones of the methods may be implemented using an alarm app on the user's mobile device, and the user may set preferences in the alarm app to define how they wish to respond to a draining battery condition that will affect an alarm. The alarm app may work in coordination with a power management app on a user's mobile device to permit the user to select optimal settings using a single button click. Advantageously, aspects of the inventive system may be implemented at the application level without the need to make changes to operating systems or hardware.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
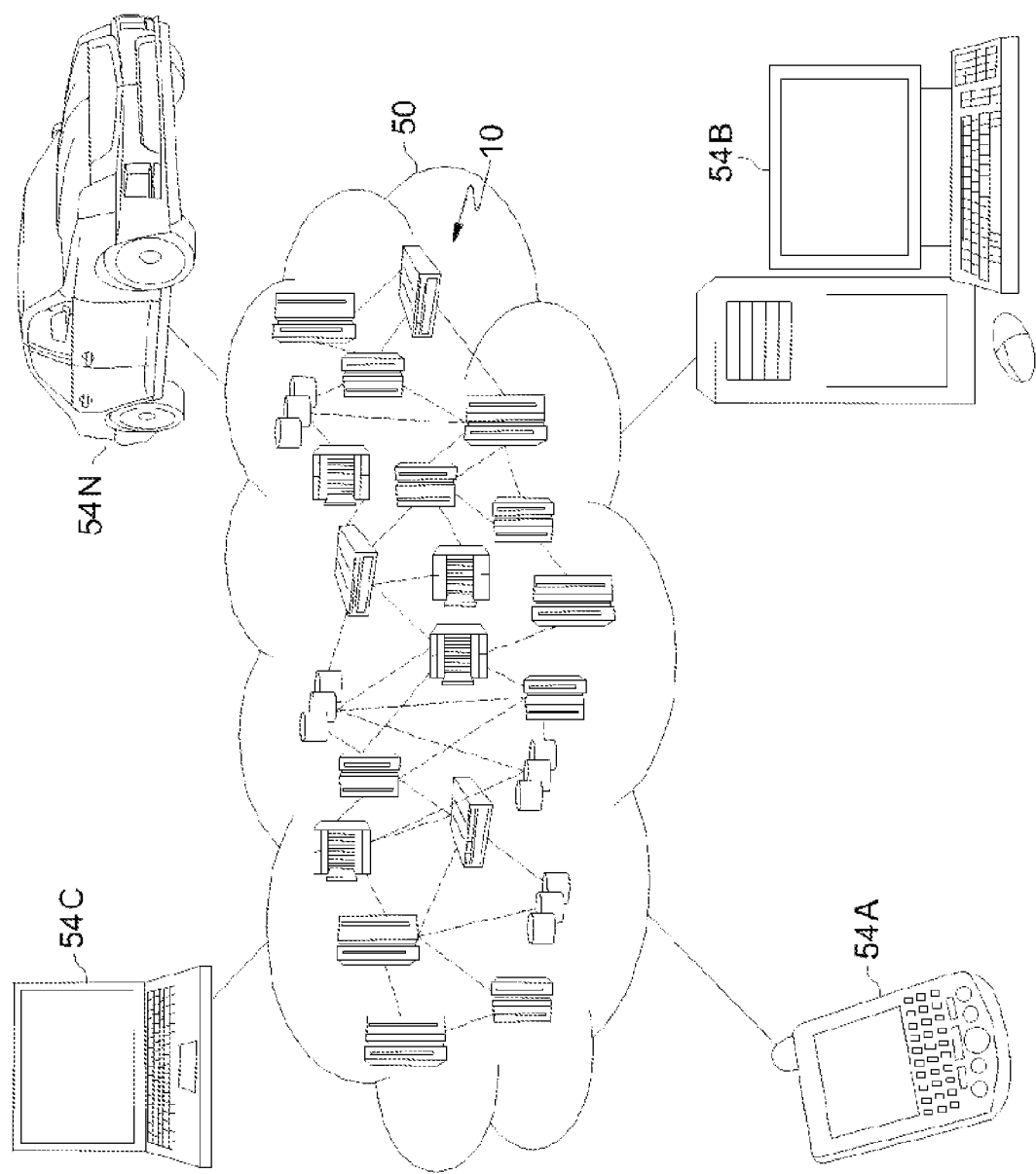
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
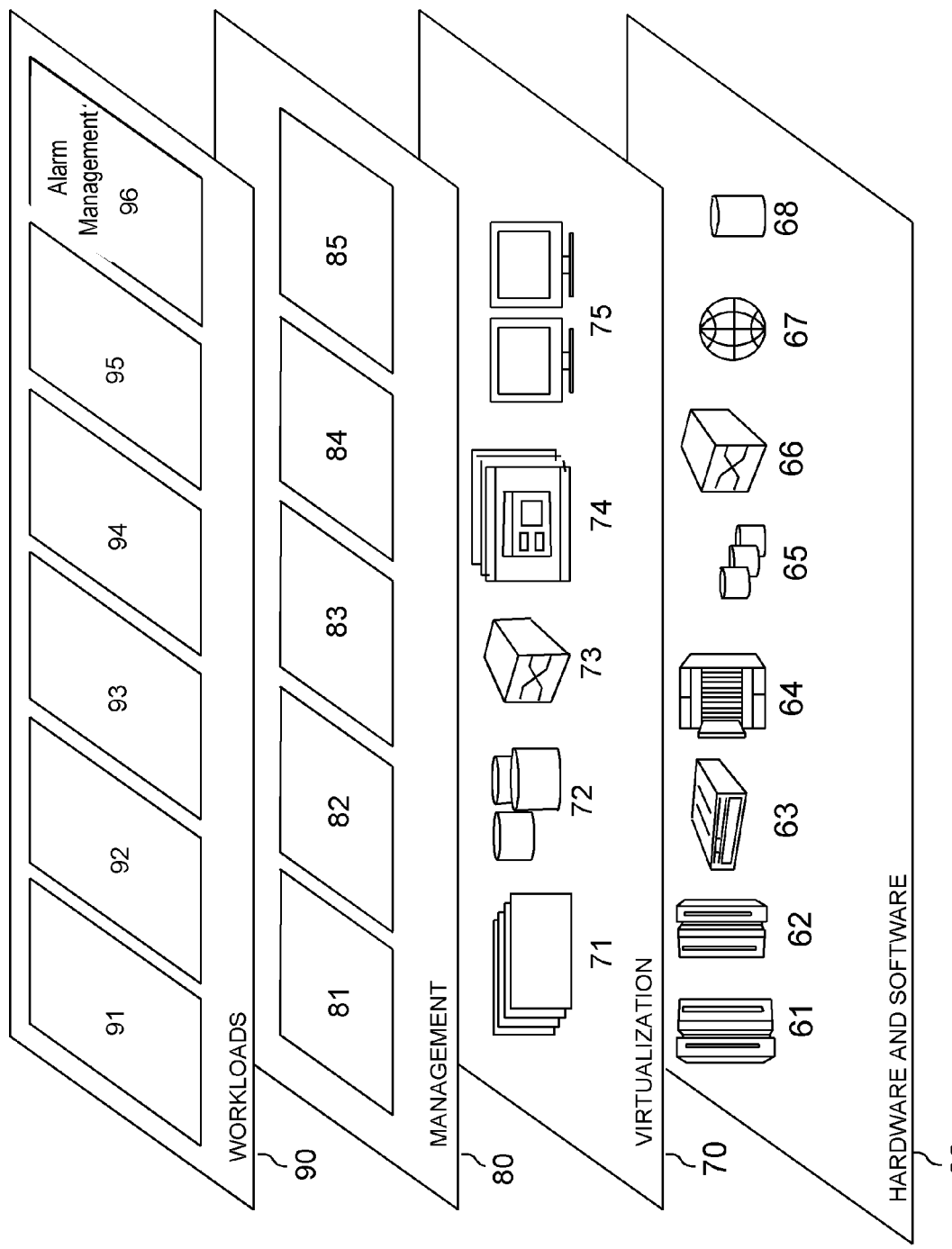
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alarm management 96.

Figure 4:
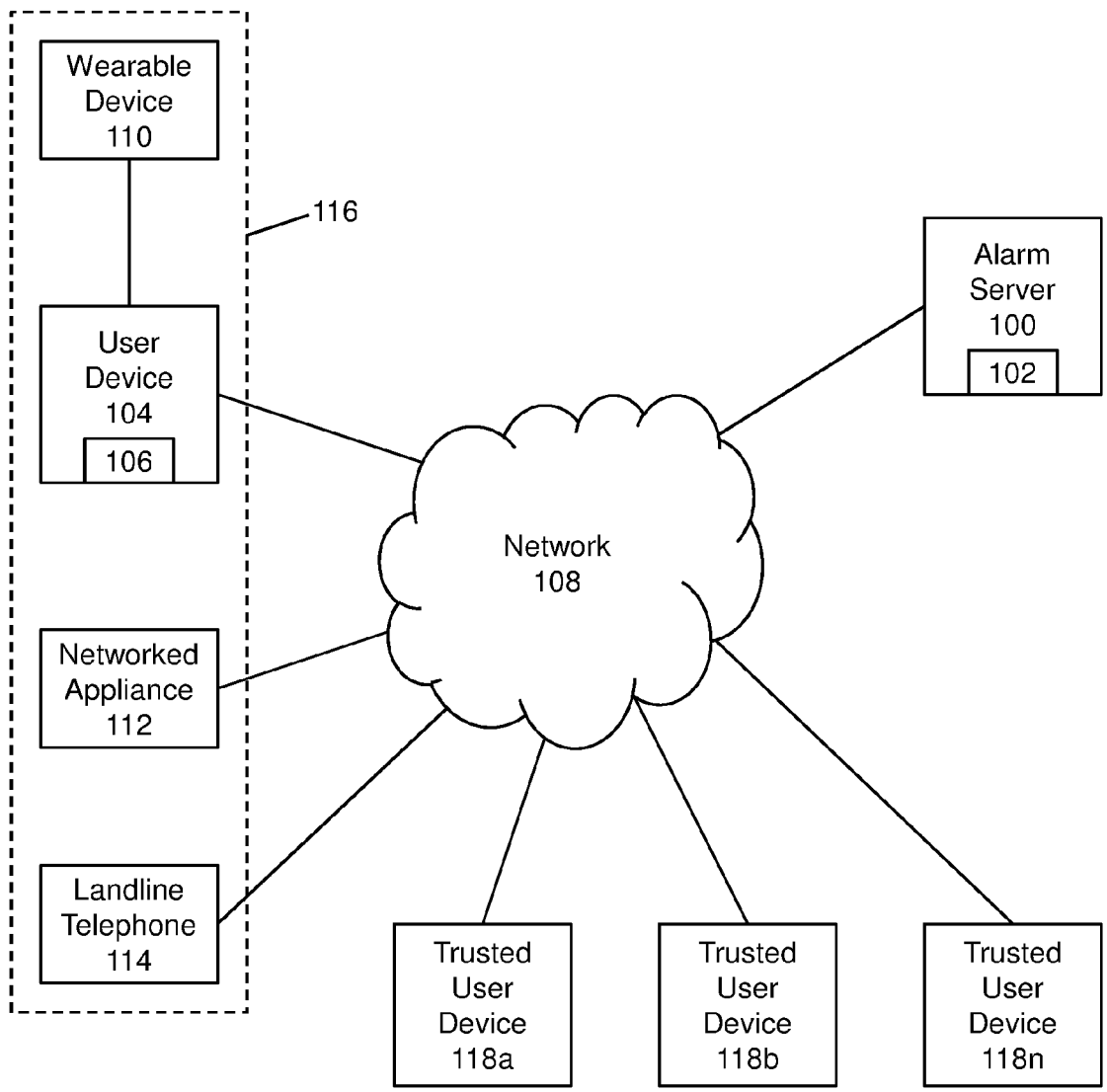
FIG. 4 shows a computing environment in accordance with aspects of the invention.

FIG. 4 shows a computing environment in accordance with aspects of the invention. In embodiments, the environment comprises an alarm server 100 running an alarm management module 102 that is configured to perform certain processes described herein. The alarm server 100 may be the computer system/server 12 of FIG. 1, and the alarm management module 102 may be one of the program modules 42 running on the computer system/server 12.

Still referring to FIG. 4, in aspects the computing environment also includes a user device 104 running an alarm app 106 (e.g., a mobile software application program) that is configured to perform certain processes described herein. In embodiments, the user device 104 comprises a mobile computing device such as a smartphone, smart watch, tablet computer, or laptop computer. In embodiments, the user device 104 comprises at least a processor, memory, display, user input device (e.g., touch screen and/or physical buttons), rechargeable battery, sound emitting device (e.g., speaker), and antenna for wireless communication. In embodiments, the alarm app 106 is configured to permit a user of the user device 104 to specify a date, time, and audible tone of an alarm (e.g., a wake-up alarm) in a conventional manner. In accordance with aspects of the invention, the alarm app 106 is also configured to monitor the battery charge status (e.g., battery percent remaining and/or estimated battery time remaining) of the user device 104.

The alarm server 100 and user device 104 may be connected to a network 108, which may be any suitable communications network such as a LAN, WAN, or the Internet. The user device 104 may thus communicate with the alarm server 100 via the network 108. In a preferred embodiment, the alarm server 100 is a node in a networked computing environment, e.g., such as node 10 in cloud computing environment 50 shown in FIG. 2, and provides cloud-based services to the user device 104.

With continued reference to FIG. 4, the computing environment may also include a wearable device 110. In embodiments, the wearable device 110 is a wearable computing device, such as a smart watch, that includes a processing unit, memory, display, user input device (e.g., touch screen and/or physical buttons), rechargeable battery, sound emitting device (e.g., speaker), and antenna for wireless communication. The wearable device 110 may further comprise at least one sensor that is configured to detect a sleep stage of a user wearing the wearable device 110. The at least one sensor may comprise, for example, a biometric sensor (e.g., a heart rate sensor) and orientation sensors (e.g., an accelerometer and a gyroscope) from which data can be analyzed to determine a sleep stage of a person wearing the wearable device 110 (e.g., sleep stage one, two, three or four). In embodiments, the wearable device 110 and the user device 104 are paired and communicate with one another using Bluetooth, Near Field Communication (NFC), or other suitable protocol. In an alternative embodiment, the user device 104 and the wearable device 110 are implemented together as a single device, e.g., a single smart watch that includes the alarm app 106 and the at least one sensor to detect a user's sleep stage.

Still referring to FIG. 4, in aspects the computing environment also includes a networked appliance 112. In embodiments, the networked appliance 112 comprises an Internet of Things (IoT) device that is connected to the network 108 and controllable by another computing device via the network 108. The networked appliance 112 may comprise a television, stereo system, lamp, or thermostat control, to name but a few non-limiting examples. There may be more than one networked appliance 112 associated with the user device 104 and connected to the network 108. In embodiments, identification (ID) information of the networked appliance 112 is specified by a user of user device 104 via the alarm app 106, and this identification information is provided to the alarm server 100 so that the networked appliance 112 can be controlled by or through the alarm server 100.

The environment of FIG. 4 may also include a landline telephone 114, which may be connected to the network 108 or alternatively to a public switched telephone network (not shown). In embodiments, the telephone number of the landline telephone 114 is specified by a user of user device 104 via the alarm app 106, and this telephone number is provided to the alarm server 100.

With continued reference to FIG. 4, the computing environment may also include a number of trusted user devices 118a, 118b, . . . , 118n. In embodiments, each trusted user device 118a-n comprises a computing device such as a smartphone, smart watch, tablet computer, laptop computer, or desktop computer. Each trusted user device 118a-n may also be connected to the network 108 for communicating with the alarm server 100. In embodiments, contact information for each trusted user device 118a-n (e.g., telephone number, email address, etc.) is specified by a user of user device 104 via the alarm app 106, and this contact information is provided to the alarm server 100 so that the alarm server 100 can contact one or more of the trusted user device 118a-n during certain processes described herein.

In some implementations, the user device 104 and at least one of the networked device 112 and the landline telephone 114 are commonly located in a location 116 such as a house, apartment, hotel room, office, etc. When a wearable device 110 is used, it may also be at the location 116.

Embodiments of the invention may employ elements of the environment of FIG. 4 for proactively and/or reactively handling a situation where a battery drain condition of the user device 104 will prevent the user device 104 from sounding an alarm at the set alarm time. Embodiments may include, for example: sounding the alarm earlier than scheduled; providing a message simultaneously to plural other users (via trusted user devices 118a-n) to take action to provide an alternate alarm; providing a message to a highest ranked one of a plurality other users to take action to provide an alternate alarm; automatically taking action to provide an alternate alarm (i.e., without involving other users); warning a user, when the user is setting the alarm, that there is a battery drain condition that may affect the alarm; and alerting a user, after the alarm is set but before the user has entered a deep sleep stage, that there is a battery drain condition that may affect the alarm. As used herein, a battery drain condition can refer to either: the battery charge level of the user device 104 dropping to or below a predefined level (e.g., 3%), or the battery charge level of the user device 104 dropping to or below a level that is insufficient to keep the device powered on until the set alarm time. As described herein, the battery drain condition may be detected by the alarm app 106, e.g., by using a battery status API (application program interface) or other method to ascertain charge level of the battery of the user device 104.

In a first embodiment, the user device 104 is configured to sound the alarm early (i.e., prior to the alarm time that was set by the user) if one or more conditions are met. A condition may include, for example: a type of alarm (e.g., critical or non-critical), and a threshold amount of time relative to the set alarm time (e.g., how early the alarm can be sounded compared to the set alarm time). In this embodiment, the user sets an alarm on their user device 104 using the alarm app 106, e.g., by specifying an alarm time. The user may also specify other alarm settings, such as an alarm date, alarm sound (e.g., ringtone, vibration, etc.), and alarm snooze settings. The user also uses the alarm app 106 to specify at least one condition, e.g., type of alarm (e.g., critical or non-critical), and threshold amount of time. The alarm app 106 monitors the remaining battery charge of the user device 104 during the time period between when the user set the alarm and the set alarm time. In the event the alarm app 106 detects a battery drain condition of the user device 104 prior to the set alarm time, the alarm app 106 then determines whether the user-specified conditions are met. If the conditions are met, then the alarm app 106 causes the user device 104 to sound the alarm early, e.g., prior to the set alarm time.

As described herein, the conditions may include a threshold amount of time that the user may specify in the settings of the alarm app 106. In this manner, the user may define a threshold amount of time in the alarm app 106, and the system may be configured to sound the alarm early only if the battery drain condition is detected within the threshold amount of time relative to the set alarm time. For example, a user may set the threshold time as one hour, and may set their alarm time as 7:00 AM. If the system detects a battery drain condition at 6:30 AM (e.g., less than one hour prior to 7:00 AM), then the system causes the user device 104 to sound the alarm at 6:30 AM (e.g., prior to the actual set time of 7:00 AM). On the other hand, if the system detects a battery drain condition at 2:30 AM (e.g., more than one hour prior to 7:00 AM), then the system will not cause the user device 104 to sound the alarm early.

In another embodiment, a user employs the alarm app 106 to define a backup alarm group of trusted users, e.g., other users identified from a contact list of the user device 104. Each member of the backup alarm group is associated with a trusted user device 118a-n, and the contact information for each trusted user device 118a-n (e.g., telephone number, email address) is provided by the user device 104 to the alarm server 100. The user may also specify at least one of a networked appliance 112 and a landline telephone 114 to the alarm app 106, which forwards this information to the alarm server 100. In embodiments, the alarm server 100 stores information received from the user device 104 (e.g., ID of backup alarm group and/or trusted user devices 118a-n, ID of networked appliance 112, telephone number of landline telephone 114) in a profile or membership associated with the user device 104, e.g., as part of a cloud service. Subsequently the user sets an alarm on their user device 104 using the alarm app 106, and the alarm app 106 monitors the battery charge of the user device 104. If the alarm app 106 detects a battery drain condition prior to the set alarm time, then the alarm app 106 communicates an alert to the alarm server 100. The alert may include data that defines: the user device 104 (e.g., device ID and/or name or user associated with the user device 104); an indication of the detected battery drain condition; and alarm settings (e.g., the set alarm time). The alarm app 106 may push the alert to the server based on detecting the battery drain condition, or the server may pull the alert from the alarm app 106 during periodic monitoring of the alarm app 106.

In this embodiment, based on the alert from the user device 104 to the alarm server 100, the alarm server 100 sends a message to each trusted user device 118a-n in the user's defined backup alarm group. The message may include data defining the user device 104 (e.g., device ID and/or name or user associated with the device), alarm settings (e.g., set alarm time), and an indication that the user device 104 is likely to fail to emit an alarm at the set alarm time. The message may also include an identification of the networked appliance 112 and/or the telephone number of the landline telephone 114. The message may also request that the trusted user perform one or more actions to provide an alternate alarm to the user associated with the user device 104. The action to provide an alternate alarm may include, for example: knock on a door at the user's location 116; send a command to control the networked appliance 112; and call the user's landline telephone 114. Controlling the networked appliance 112 may include one of the trusted users sending a command from one of the trusted user devices 118a-n to turn on a stereo, lights, or television at the user's location 116, for example.

In another embodiment, the alarm server 100 ranks the members of the backup alarm group and sends the message to one member of the group at a time based on the ranking. Similar to the previously described embodiment that utilizes the backup alarm group, the message in this embodiment may include data defining the user device 104, alarm settings, and an indication that the user device 104 is likely to fail to emit an alarm at the set alarm time. The message may also include an identification of the networked appliance 112 and/or the telephone number of the landline telephone 114. The message may also request that the trusted user perform one or more actions to provide an alternate alarm to the user associated with the user device 104, e.g., knock on a door at the user's location 116; send a command to control a networked appliance 112; and call the user's landline telephone 114. However, in contrast to the previously described embodiment that sends the message to all members of the backup alarm group, this embodiment only sends the message to one member at a time, i.e., the highest ranked member of the backup alarm group that has not already been messaged. In this implementation, if a first member of the backup alarm group does not achieve the desired result (i.e., wake up the user associated with user device 104), then the alarm server 100 sends the message to the next highest ranked member of the backup alarm group. In embodiments, the system continues polling the members of the backup alarm group individually until the desired result is achieved. The members of the backup alarm group may be ranked using any suitable parameters, including their GPS location (e.g., proximity of their trusted user device 118*a* to the user device 104), and their alertness state (e.g., whether the trusted user is awake or asleep, which may be detected using a wearable device and/or the trusted user device 118*a*).

In another embodiment, the alarm server 100 does not contact members of a user-defined backup alarm group, but instead automatically takes action to provide an alternate alarm to the user associated with the user device 104 (e.g., to attempt to wake the user associated with the user device 104). In this embodiment, the user sets an alarm on their user device 104 using the alarm app 106. The alarm app 106 then monitors the battery charge of the user device 104. In the event the alarm app 106 determines a battery drain condition of the user device 104 prior to the set alarm time, the alarm app 106 communicates this condition to the alarm server 100, e.g., either by push or pull communication as previously described. The alarm server 100 then provides an alternate alarm to the user by sending a command to control a networked appliance 112 and/or calling the user's landline telephone 114.

In another embodiment, a proactive approach includes warning the user, when an alarm is being set by the user, that a battery drain condition may affect the alarm being set. In embodiments, the alarm app 106 is configured to determine an estimated remaining time (e.g., hours, minutes seconds) of battery charge of the user device 104. The alarm app 106 may be programmed to make this determination alone or by coordinating with a power management app of the user device 104. The estimated remaining time may be determined in any suitable fashion including but not limited to: straight line extrapolation of time versus percent battery remaining; historical battery usage (e.g., depletion rate) for this user device 104; and estimations of battery usage (e.g., depletion rate) based on apps that are currently running on the user device 104. Based on the estimated remaining battery time, the alarm app 106 may be configured to provide a warning message to the user when the user is attempting to set the alarm, i.e., that there is insufficient battery charge to keep the user device 104 powered to the desired alarm time. The alarm app 106 may be configured to display a message requesting that the user plug in the user device 104 to charge the battery. The alarm app 106 may be configured to prevent the user from setting the desired alarm, i.e., by not accepting a user input that would likely result in a failed alarm. After displaying the message, the alarm app 106 may be configured to save the alarm if it is detected that the user has plugged in the user device 104 for recharging the battery.

In another embodiment, the alarm app 106 is configured to cause an alert to the user when a battery drain condition of the user device 104 is detected and when the user is detected as being in a predefined sleep stage. The alert may be provided by the user device 104 and/or the wearable device 110. In this embodiment, after the user sets an alarm on the user device 104, the alarm app 106 monitors the battery level of the user device and the wearable device 110 monitors the sleep stage of the user. If a battery drain condition of the user device 104 is detected concurrently with the user being detected in a particular sleep stage (e.g., stage one), then the alarm app 106 causes an alert to occur to notify the user of the battery drain condition before the user falls into a later sleep stage (e.g., stage two, three, or four). The alert may comprise a vibration of the wearable device 110 that is felt by the user. The alert may additionally or alternatively comprise a sound emitted by the user device 104 and/or the wearable device 110.

FIGS. 5-10 show flowcharts of methods in accordance with aspects of the invention. The steps of FIGS. 5-10 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

Figure 5:
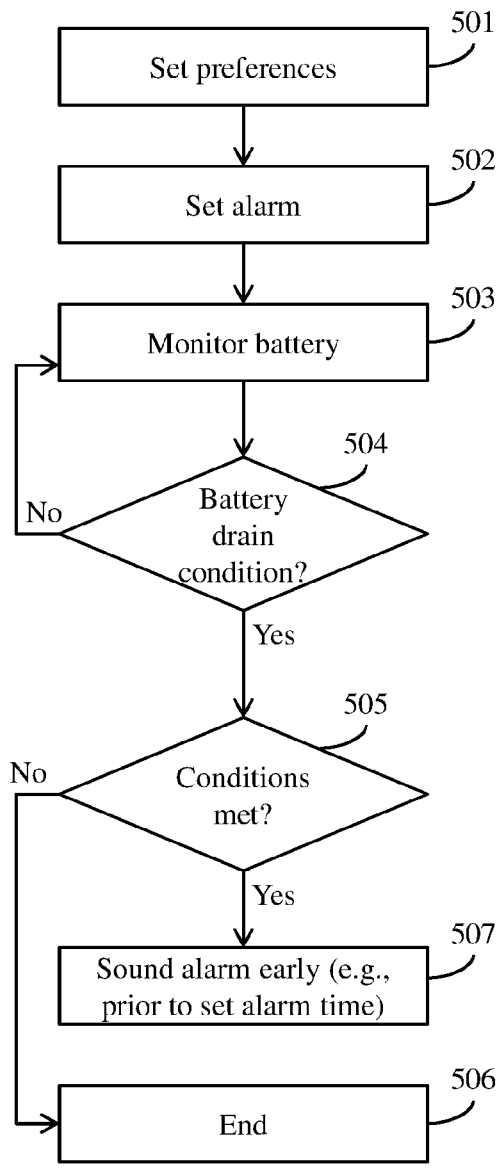

FIG. 5 shows a flowchart of a method in which the user device 104 is configured to sound an alarm early (i.e., prior to the set alarm time) when a battery drain condition is detected and when one or more conditions are met. At step 501, the user sets preferences in the alarm app 106. The preferences may include a condition comprising a threshold amount of time that corresponds to how early the alarm is permitted to sound in the event of a low battery condition. The preferences may include a condition comprising an indication of a first type of alarm (e.g., critical) for which early alert is permitted, and a second type of alarm (e.g., non-critical) for which early alert is not permitted. Step 501 may include the user device 104 receiving and storing the user input.

At step 502, the user sets the alarm using the alarm app 106 on the user device 104. Setting the alarm may include specifying an alarm time, alarm date, alarm sound, and type of alarm (e.g., critical or non-critical). Step 502 may include the user device 104 receiving and storing the user input.

At step 503, the alarm app 106 monitors the remaining battery charge of the user device 104. At step 504, the alarm app 106 determines whether a battery drain condition exists for the user device 104. In the event a battery drain condition is not detected, the process returns to step 503. In the event a battery drain condition is detected, then at step 505 the alarm app 106 evaluates the user preferences (from step 501) and determines whether the user-defined conditions are met. If the conditions are not met (e.g., the alarm type is the second type, or the current time is not within the threshold amount of time relative to the set alarm time), then the process ends at step 506. If the conditions are met (e.g., the alarm type is the first type, and the current time is within the threshold amount of time relative to the set alarm time), then at step 507 the alarm app 106 causes the user device 104 to emit the alarm early (e.g., prior to the set alarm time).

Figure 6:
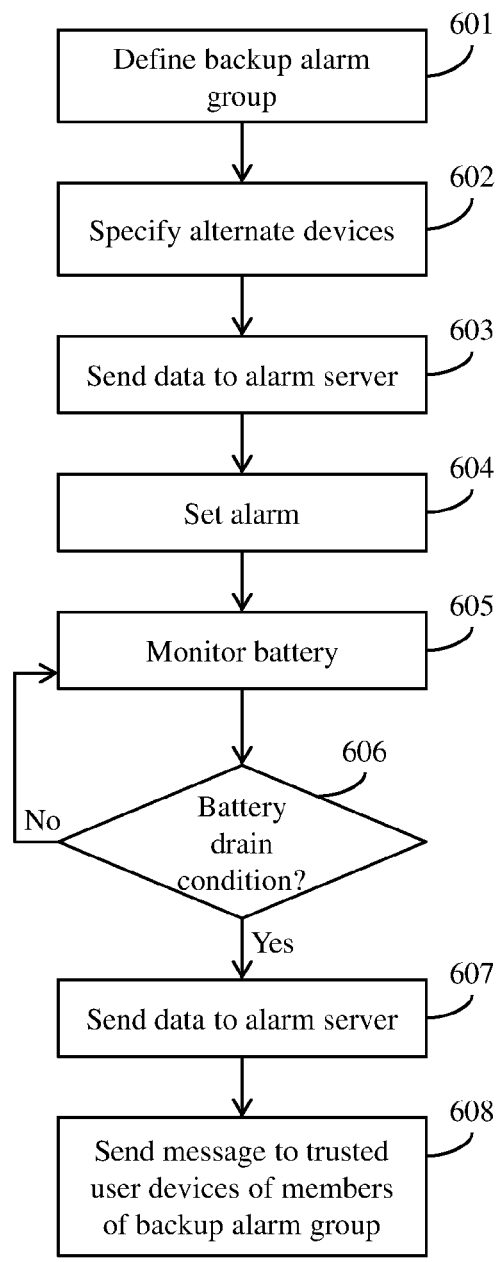

FIG. 6 shows a flowchart of a method in which the system is configured to alert a backup alarm group when a battery drain condition is detected. At step 601, the user defines a backup alarm group in the alarm app 106, e.g., by selecting trusted users from a contact list stored in the user device 104. Step 601 may include the user device 104 receiving and storing the user input.

At step 602, the user specifies alternate alarm devices in the alarm app 106. The alternate alarm devices may comprise at least one of a networked appliance 112 and a landline telephone 114. The step of specifying the alternate alarm devices may include providing a device ID of a networked appliance 112 and a telephone number of the landline telephone 114. Step 602 may include the user device 104 receiving and storing the user input.

At step 603, the user device 104 sends data to the alarm server 100. In embodiments, the data sent at step 603 includes an ID of members of the backup alarm group, e.g., device ID's for trusted user devices 118*a-n*. The data sent at step 603 may also include a device ID of a networked appliance 112 and a telephone number of the landline telephone 114. Step 603 may include the alarm server 100 receiving and storing this data in a profile or membership associated with the user or user device 104.

At step 604, the user sets the alarm using the alarm app 106 on the user device 104. Setting the alarm may include specifying an alarm time, alarm date, alarm sound, and type of alarm (e.g., critical or non-critical). Step 604 may include the user device 104 receiving and storing the user input.

At step 605, the alarm app 106 monitors the remaining battery charge of the user device 104. At step 606, the alarm app 106 determines whether a battery drain condition exists for the user device 104. In the event a battery drain condition is not detected, the process returns to step 605. In the event a battery drain condition is detected, then at step 607 the alarm app 106 sends data to the alarm server 100. The data may be pushed by the user device 104 to the alarm server 100, or pulled by the alarm server 100 as part of periodic monitoring of the user device 104. The data sent at step 607 may define the user device 104, alarm settings, and an indication of the detected battery drain condition, e.g., as described with respect to FIG. 4.

At step 608, the alarm server 100 sends a message to a trusted user device 118*a-n* of each member of the backup alarm group. The message may include data defining the user associated with the user device 104, the set alarm time, and an indication that the user device 104 is likely to fail to emit an alarm at the set alarm time. The message may also include the ID the networked appliance 112 and the telephone number of the landline telephone 114. The message may also request that the trusted users perform one or more actions to provide an alternate alarm to the user associated with the user device 104, e.g., knock on a door at the user's location 116, send a command to control a networked appliance 112, or call the user's landline telephone 114, e.g., in a manner similar to that described with respect to FIG. 4.

Figure 7:
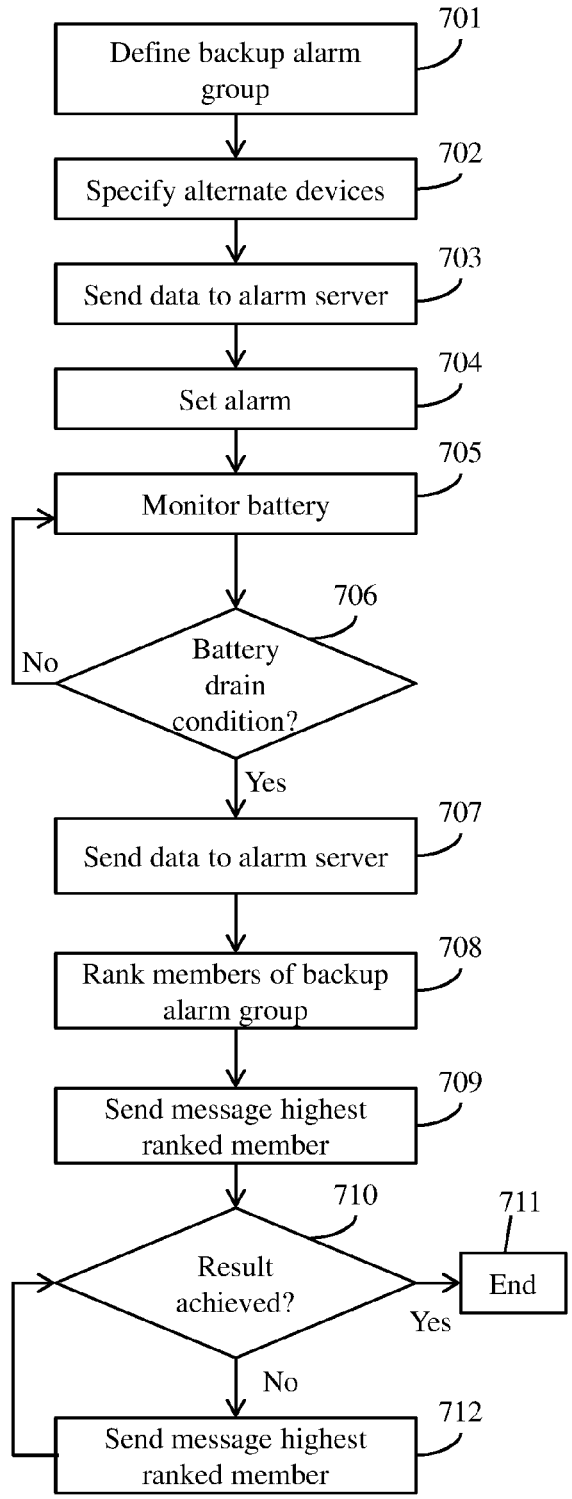

FIG. 7 shows a flowchart of a method in which the system is configured to alert individual members of a backup alarm group when a battery drain condition is detected. Steps 701-707 are similar to and may be performed in the same manner as steps 601-607, respectively.

At step 708, the alarm server 100 ranks the members of the backup alarm group that was defined at step 701. In embodiments, the alarm server 100 generates a ranked list of the members based on at least one of: a determined GPS location of each member (e.g., proximity of their trusted user device 118*a* to the user device 104), and a determined alertness state (e.g., whether the trusted user is awake or asleep, which may be detected using a wearable device and/or the trusted user device 118*a*). The ranking may also be based on type of alarm action as alternative backups.

At step 709, the alarm server 100 send a message to the highest ranked member of the backup alarm group according to the ranking from step 708. The message may be similar in content to the message described with respect to step 608. However, at step 709, the message is sent to only one member of the backup alarm group, rather than being sent to all members of the group.

At step 710, the alarm server determines whether the desired result has been achieved. For example, the alarm server may receive a communication from the user that was messaged at step 709 that the user associated with user device 104 is awake. In another example, the alarm server may determine that the user associated with user device 104 is awake, e.g., by detecting actions at the user device 104 and/or wearable device 110 that are predefined as indicating an awake state of the user.

If the alarm server 100 determines that the user is awake at step 710, then the process ends at step 711. On the other hand, if the alarm server 100 determines that the user is not awake at step 710, then at step 712 the alarm server sends the message to the next highest ranked member in the ranked list from step 708, and the process returns to step 710.

Figure 8:
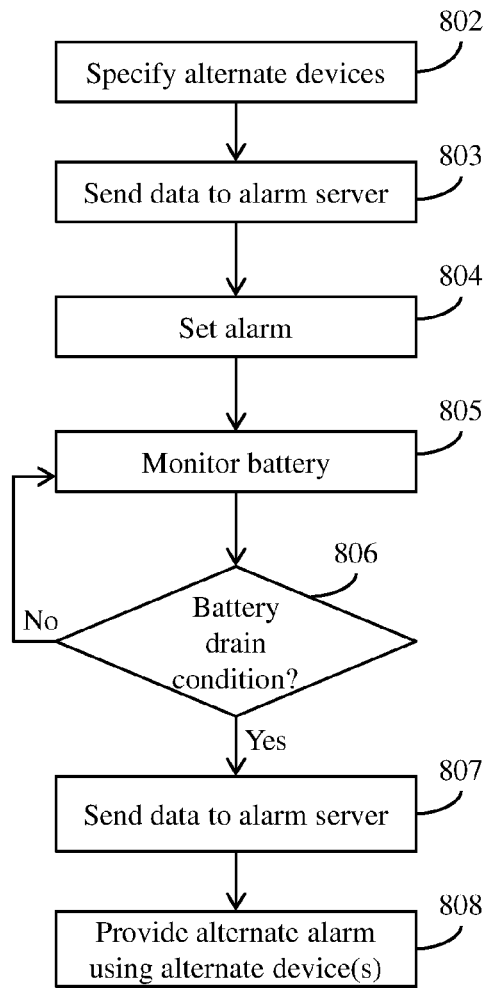

FIG. 8 shows a flowchart of a method in which the system is configured to automatically alert a user when a battery drain condition is detected. At step 802, the user specifies alternate alarm devices using the alarm app 106. The alternate alarm devices may comprise at least one of a networked appliance 112 and a landline telephone 114. The step of specifying the alternate alarm devices may include providing a device ID of a networked appliance 112 and a telephone number of the landline telephone 114. Step 802 may include the user device 104 receiving and storing the user input.

At step 803, the user device 104 sends data to the alarm server 100. In embodiments, the data sent at step 803 includes a device ID of a networked appliance 112 and a telephone number of the landline telephone 114. Step 803 may include the alarm server 100 receiving and storing this data in a profile or membership associated with the user or user device 104.

At step 804, the user sets the alarm using the alarm app 106 on the user device 104. Setting the alarm may include specifying an alarm time, alarm date, alarm sound, and type of alarm (e.g., critical or non-critical). Step 804 may include the user device 104 receiving and storing the user input.

At step 805, the alarm app 106 monitors the remaining battery charge of the user device 104. At step 806, the alarm app 106 determines whether a battery drain condition exists for the user device 104. In the event a battery drain condition is not detected, the process returns to step 805. In the event a battery drain condition is detected, then at step 807 the alarm app 106 sends data to the alarm server 100. The data may be pushed by the user device 104 to the alarm server 100, or pulled by the alarm server 100 as part of periodic monitoring of the user device 104. The data sent at step 807 may define the user device 104, alarm settings, and an indication of the detected battery drain condition, e.g., as described with respect to FIG. 4.

At step 808, the alarm server 100 provides an alternate alarm using the alternate device(s) that were specified in step 802. For example, step 808 may comprise the alarm server 100 sending a command to control a networked appliance 112 (e.g., to turn on a stereo, light, or television in the location 116, or to turn off the air conditioning in the location 116). As another example, step 808 may comprise the alarm server 100 placing a call to the landline telephone 114.

FIG. 9 shows a flowchart of a method in which the system warns the user that a battery drain condition may affect an alarm that is being set by the user. At step 901, the user sets the alarm using the alarm app 106 on the user device 104. Setting the alarm may include specifying an alarm time, alarm date, alarm sound, and type of alarm (e.g., critical or non-critical). Step 901 may include the user device 104 receiving and storing the user input.

At step 902, the alarm app 106 determines an estimated remaining time (e.g., hours, minutes seconds) of battery charge of the user device 104. This may be performed in the manner described with respect to FIG. 4.

At step 903, the alarm app 106 determines whether a battery drain condition exists for the alarm (from step 901)

based on the estimated remaining time of battery charge (from step 902). If it is determined that a battery drain condition does not exist, then at step 904 the alarm app 106 saves the alarm (from step 901). If it is determined that a battery drain condition does exist, then at step 905 the alarm app 106 provides a warning to the user. In embodiments, the warning comprises a visual display and/or sound emitted by the user device 104. In a particular embodiment, the warning comprises a message displayed by the user device 104, wherein the message indicates that there is insufficient battery charge to keep the user device 104 powered to the desired alarm time. The message may also instruct the user to plug in the user device 104 to charge the battery of the user device 104.

At step 906, the alarm app 106 detects that the user device 104 is plugged in and that the battery of the user device 104 is charging. Based on the detecting at step 906, the process proceeds to step 904.

FIG. 10 shows a flowchart of a method in which the system provide an alert to the user when a battery drain condition of the user device 104 is detected and when the user is detected as being in a predefined sleep stage. At step 1001, the user device 104 and wearable device 110 are paired, e.g., using Bluetooth, NFC, or other suitable protocol.

At step 1002, the user sets the alarm using the alarm app 106 on the user device 104. Setting the alarm may include specifying an alarm time, alarm date, alarm sound, and type of alarm (e.g., critical or non-critical). Step 1002 may include the user device 104 receiving and storing the user input.

At step 1003, the alarm app 106 monitors the remaining battery charge of the user device 104. At step 1004, the alarm app 106 determines whether a battery drain condition exists for the user device 104. In the event a battery drain condition is not detected, the process returns to step 1003. In the event a battery drain condition is detected, then at step 1005 the system detects the sleep stage of the user. In embodiments, the wearable device 110 detects the current sleep stage of the user (e.g., in a manner described with respect to FIG. 4) and communicates the detected sleep stage to the user device 104.

At step 1006, the alarm app 106 determines whether the detected sleep stage (from step 1005) is acceptable. In embodiments, the user may specify which sleep stages are acceptable and which sleep stages are not acceptable, e.g., in the preferences of the alarm app. For example, a user may specify that sleep stage one is acceptable and that sleep stages two, three, and four are not acceptable. In embodiments, at step 1006, the alarm app 106 compares the detected sleep stage (from step 1005) to the predefined acceptable sleep stage(s). If the sleep stage is acceptable, then at step 1007 the alarm app 106 provides an alert to the user. The alert may comprise a vibration of the wearable device 110 that is felt by the user. The alert may additionally or alternatively comprise a sound emitted by the user device 104 and/or the wearable device 110. On the other hand, if the sleep stage is determined as not acceptable as step 1006, then the process ends at step 1008.

In implementations of the invention, aspects of the different embodiments and method may be used in combination with one another to provide a multi-faceted backup system for an alarm on the user device. For example, a method may begin at step 901, and the alarm that is saved at step 904 may serve as the alarm that is saved at any of steps 502, 604, 704, 804, or 1002. In another example, a method may proceed from step 507 (e.g., the conditions for early alert are not met) to the method defined in one of FIGS. 6-8.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for performing one or more of the processes described herein. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computing device, preference data from a user device;
    receiving, by the computing device, a set alarm time of the user device;
    determining, by the computing device, an alert from the user device indicates that a battery drain condition of the user device will result in a failed alarm at the set alarm time at the user device;
    based on the receiving the alert, determining a ranked list of members of a backup alarm group specified in the preference data, wherein each member of the members is ranked based on a proximity of each member of the members to the user device and an alertness state of each member of the members; and
    sending a message to the highest ranked member in the ranked list, wherein the message instructs the highest ranked member to provide an alternate alert to a user associated with the user device.

2. The method of claim 1, wherein:
    the computing device comprises a server; and
    the user device comprises one of a smartphone, a smart watch, a tablet computer, and a laptop computer.

3. The method of claim 1, wherein the battery drain condition of the user device is based on at least one of:
- a battery charge level of the user device being less than or equal to a predefined level; and
- the battery charge level of the user device being insufficient to maintain the user device in a powered on state until the set alarm time.

4. The method of claim 1, wherein the computing device includes software provided as a service in a cloud environment.

5. The method of claim 1, further comprising deploying a system for providing a backup alarm, comprising providing a computer infrastructure operable to perform the steps of claim 1.

6. The method of claim 1, wherein a service provider at least one of creates, maintains, deploys and supports the computing device.

7. The method of claim 1, wherein steps of claim 1 are provided by a service provider on a subscription, advertising, and/or fee basis.

8. A system comprising:
- a central processing unit (CPU), a computer readable memory and a non-transitory computer readable storage medium, for storing program instructions that executed by the CPU, associated with a computing device;
- program instructions to receive, by the computing device, preference data from a user device;
- program instructions to receive, by the computing device, a set alarm time of the user device;
- program instructions to determine, by the computing device, an alert from the user device indicates that a battery drain condition of the user device will result in a failed alarm at the set alarm time at the user device;
- program instructions to, based on the receiving the alert, determine, by the computing device, a ranked list of members of a backup alarm group specified in the preference data, wherein each member of the members is ranked based on a proximity of each member of the members to the user device and an alertness state of each member of the members; and
- program instructions to send, by the computing device, a message to the highest ranked member in the ranked list, wherein the message instructs the highest ranked member to provide an alternate alert to a user associated with the user device.

* * * * *